United States Patent [19]

Motoo et al.

[11] Patent Number: 4,797,380

[45] Date of Patent: Jan. 10, 1989

[54] METHOD FOR PRODUCING HIGHLY DISPERSED CATALYST

[75] Inventors: Satoshi Motoo; Masahiro Watanabe, both of Kofu, Japan

[73] Assignees: Satoshi Motoo; Masahiro Watanabe; Tanaka Kikinzoku Kogyo K.K., all of Japan

[21] Appl. No.: 22,073

[22] Filed: Mar. 5, 1987

[30] Foreign Application Priority Data

Mar. 6, 1986 [JP] Japan ............................ 61-49480
Mar. 6, 1986 [JP] Japan ............................ 61-49481

[51] Int. Cl.$^4$ ............................................. B01J 31/06
[52] U.S. Cl. ...................................... 502/159; 502/150; 502/152; 502/339; 502/439; 502/527; 525/360
[58] Field of Search ............... 502/159, 150, 439, 527, 502/339, 152; 525/360

[56] References Cited

U.S. PATENT DOCUMENTS

| | | | |
|---|---|---|---|
| 3,997,472 | 12/1976 | O'Driscoll et al. | 502/159 |
| 4,123,396 | 10/1978 | Rembaum et al. | 525/363 |
| 4,228,035 | 10/1980 | Gray et al. | 585/275 |
| 4,259,223 | 3/1981 | Rembaum et al. | 502/159 |
| 4,290,918 | 9/1981 | Bayer et al. | 260/429 CY |
| 4,292,198 | 9/1981 | Gerritsen et al. | 502/159 |
| 4,292,199 | 9/1981 | Rohrbach et al. | 502/159 |
| 4,311,812 | 1/1982 | Manziek | 528/481 |
| 4,631,263 | 12/1986 | Mizumoto et al. | 502/4 |

*Primary Examiner*—Anthony McFarlane
*Attorney, Agent, or Firm*—Stefan J. Klauber

[57] ABSTRACT

A method for producing a highly dispersed catalyst comprising mixing a cross linking agent with a polymer in a solvent to cross-link the polymer, applying the cross-linked mixed liquid to a carrier, drying the carrier to remove the solvent and to form a polymer film over the surface of the carrier, impregnating the polymer film with a metallic complex compound solution to connect the complex compound to a reactive functional group of the polymer film, and reducing the complex compound of the polymer film, thereby obtaining the highly dispersed catalyst having superior catalytic properties and superior catalytic efficiency.

5 Claims, No Drawings

METHOD FOR PRODUCING HIGHLY DISPERSED CATALYST

BACKGROUND OF THE INVENTION

The present invention relates to a method for producing a highly dispersed catalyst for use in a variety of technical fields such as organic synthesis, hydrogenation, oxdation, reduction, a fuel cell, electrolysis and so forth.

For producing a catalyst in a conventional manner, there are two typical methods such as a direct reducing method and a colloidal method.

In the direct reducing method, a salt of an objective metal is dissolved in a solution and a carrier is immersed in this solution. Then, a reducing agent such as formalin and hydrazine is added to the solution to deposit a metallic cluster. In this method, it is impossible to obtain a carried catalyst having the clusters of the uniform size, for instance, less than 30 Å.

In the colloidal method, the uniform minute clusters can be obtained, but in a method using a reducing agent such as sodium hydrosulfite ($Na_2S_2O_4$) and sodium bisulfite ($NaHSO_3$), the sulfur in the reducing agent is mixed in the obtained catalyst, which brings about disadvantages in many catalytic reactions. In order to remove the mixed sulfur from the catalyst, particular equipment as well as time is required. Accordingly, the operational efficiency for producing the catalyst is bad. On the other hand, in a method adding polyvinyl alcohol as a protecting agent for the colloid before an alcoholic reduction, it is very difficult to remove a great deal of the added polyvinyl alcohol after the reduction. When the solution is heated in order to remove the polyvinyl alcohol, the clusters grow and the cluster size is enlarged.

In another conventional method, a charge-transfer polyvinyl acetate polymer film is impregnated with a metallic ion and then the metal is deposited. In this case, the size of the obtained clusters is large, such as several hundreds Å, and the properties of the catalyst are poor due to the velocity control of the mass transfer in the film.

SUMMARY OF THE INVENTION

Accordingly, it is an object of the present invention to provide a method for producing a highly dispersed catalyst of which ultraminute metallic particles are supported in high dispersion by a carrier, free from the aforementioned defects and disadvantages of the prior art, which is capable of readily and effectively producing a highly dispersed catalyst having superior catalytic properties and superior catalytic efficiency.

In accordance with one aspect of the invention, there is provided a method for producing a highly dispersed catalyst comprising mixing a cross linking agent with a high polymer substance having a reactive functional group in its molecular chain in a solvent in order to cross-link the high polymer substance with the cross linking agent, applying the obtained mixed liquid to a carrier, drying the carrier in order to remove the solvent therefrom, to form a high polymer film of the high polymer substance over the surface of the carrier, impregnating the high polymer film with a metallic complex compound in order to connect the complex compound to the reactive functional group of the high polymer substance, and reducing the complex compound connected to the high polymer substance.

Other and further objects, features and advantages of the invention will appear more fully from the following description with reference to the preferred embodiment thereof.

DESCRIPTION OF THE PREFERRED EMBODIMENT

In a method for producing a highly dispersed catalyst according to the present invention, a high polymer substance having a reactive functional group in its molecular chain is a high polymer substance which can be cross-linked by a cross linking agent, such as polyethylene imine $[(-(CH_2)_2NH-)_n]$, polyacrylic acid and a high polymer substance having a side chain. Such high polymer substances are cross-linked by the cross linking agent in order to form insoluble films of the high polymer substances. A cross linking agent used in this method is glutaraldehyde $[(CH_2)_3(CHO)_2]$, glutaric acid $[(CH_2)_3(COOH)_2]$, adipic acid $[(CH_2)_4(COOH)_2]$, adipyl chloride $[(CH_2)_4(COCl)_2]$, 1,6-dibromohexane $[(CH_2)_6Br_2]$, hexamethylenediamine $[(CH_2)_6(NH_2)_2]$, adipamide $[(CH_2)_4(CO)_2(NH_2)_2]$, or the like. A solvent for use in dissolving the high polymer substance is water, an alcohol, acetone, chloroform, tetrahydrofuran or other organic solvent. A carrier on which the cross-linked high polymer substance solution is applied, is a conductive carrier for use in a fuel cell catalyst such as carbon, a metallic carbide and a metal, and for use in a general catalyst such as an oxide, a carbide and a nitride, or a semiconductor and a high polymer film. Any solid carrier may be used irrespective of material.

The amount of the high polymer substance to be used depends on the specific surface area of the carrier and is the amount covered by the high polymer substance molecular film equivalent to 0.1–50 molecular layers, preferably 1–10 molecular layers of the true surface area of the carrier. The amount of the cross linking agent to be used is at most 30 mol %, preferably 1–5 mol % with reference to the reactive functional group of the high polymer substance, for instance, the amine unit ($-NH-$) of the polyethylene imine.

The process for applying the mixture of the cross-linked high polymer substance and the solvent to the carrier is not restricted, and hence coating, impregnation, immersion and other suitable processes may be used for this step. This applied mixture of the cross-linked high polymer substance and the solvent is dried at an ambient temperature or by heating in order to remove the solvent, thereby forming a high polymer film over the carrier. By heating, the cross linking bonds can be strengthened.

Then, a metallic complex compound is applied in the form of a solution to the obtained high polymer film of the carrier in order to couple the complex compound to the reactive functional group of the high polymer film. This coupling is preferably an equilibrium adsorption, that is, the exact quantities of coupling should be carried out. For example, in a chloroplatinic acid solution of 50 ppm, the equilibrium adsorption is sufficiently attained in four hours. The coupling is formed in the a pH range 1–13, preferably pH range of 5–10.

The complex compound of the solution is a complex compound of a platinum group metal such as platinum, palladium and ruthenium, a base metal, or both to which the reactive functional group in the molecular chain of the high polymer substance, for instance, the amine group (—NH—) of the polyethylene imine, is able to be coordinate-adsorbed. The excess complex compound remaining in the high polymer film is preferably removed by washing with water, after the coupling of the complex compound to the reactive functional group of the high polymer film.

The reduction of the complex compound is carried out by an electrolytic reducing process or a heating reducing process in a hydrogen gas atmosphere. In addition, a reducing process using formic acid, sodium formate, formalin, methanol, hydrazine, sodium tetrahydroborate ($NaBH_4$), citric acid, oxalic acid, or the like, may be used. In these reducing processes, the heating reducing process in the hydrogen gas atmosphere is most preferable, and the heating temperature is at least 150° C. In order to reduce the processing time, the heating temperature may be at least 200° C. In case of a conductive carrier having a low catalyst carrying rate or a small specific surface area, the electrolytic reduction is readily conducted. For example, when reducing at 0.05 volt with respect to a hydrogen electrode in a one mol sulfuric acid solution, the reduction is completely attained within a few seconds.

In the method according to the present invention, since the complex compounds are coupled to the reactive functional groups which are equally distributed in the high polymer film, the catalyst particles are carried in a high dispersion by the carrier and consequently the catalyst having high catalytic properties can be obtained.

The metallic atoms produced in the oxide after the reduction process may be oxidized to form superminute oxide particles, as occasion demands. Further, after the reducing process of the complex compound of the high polymer substance, the carrier may be heated in order to remove the high polymer film by decomposing the same.

EXAMPLE 1

Polyethylene imine which was prepared in a quantity equivalent to 5 molecular layers covering over the entire surface of a carrier hereinafter mentioned, was mixed in water to dissolve therein, and 3 mol % glutaraldehyde with respect to the amine unit (—NH—) of the polyethylene imine was mixed into the solution to cross-link the polyethylene imine to obtain a cross-linked mixture solution. Then, the cross-linked mixture solution was applied to a surface of a mirror surface finish glassy carbon carrier having dimensions 0.8 mm thick, 50 mm long and 50 mm wide, and then the carrier was dried to form a high polymer film of the polyethylene imine over the surface of the carrier. Next, the dried carrier was immersed in a chloroplatinic acid solution of pH 4 for 4 hours in order to react the chloroplatinic acid with the amine group of the polyethylene imine, thereby connecting the platinic chloride to the amine group of the polyethylene imine by adsorption. Then, after simply washing the surface of the carrier, the carrier was reduced in a hydrogen gas atmosphere at 150° C. by heating to obtain a platinum catalyst of which the platinum in the atomic state, carried by the glassy carbon, was dispersed in high dispersion.

The surface area of the obtained platinum catalyst was measured by an electrochemical method such as a voltammetry relating to a hydrogen adsorption/desorption, and the total amount of the deposited platinum was obtained by a fluorescent X-ray analysis, with the result of at least 200 m²/g of specific surface area of the platinum catalyst and highly despersed platinum group minute particles of at most 10 Å particle size. By observing the superminute platinum particles using a high resolution electron microscope, their existence (less than 10 Å) could be barely confirmed. Further, when the activity per a true surface area unit of the obtained catalyst was compared with that of a platinum plate electrode, the two activities were quite the same in an oxygen reducing reaction, but, as the carried density was lowered, the activity of the catalyst increased in a hydrogen generating or an organic oxidation reaction of formic acid, methanol or the like.

Then, the carrier was heated at 350° C. for 20 minutes in the hydrogen atmosphere of a heating furnace in order to remove the high polymer film by decomposing the same, thereby obtaining a platinum catalyst having platinum clusters of an average size of at most several tens Å, carried in a high dispersion by the carrier. An inert gas atmosphere of nitrogen or argon gas in the heating furnace may be used. The obtained platinum particles were observed by a replica method using a transmission type electron microscope, and a uniform dispersion of the uniform particles having an average particle size of 25 Å was confirmed. Further, in a comparison test of activities per a true surface area unit between the present platinum catalyst and the platinum plate electrode, the activities of the glassy carbon electrode carrying the highly dispersed platinum particles prepared by the present method, were well coincident with one another in the oxygen reduction, the hydrogen oxidation and the hydrogen generating.

It is readily understood from the above description that according to the present method for producing a highly dispersed catalyst, the highly dispersed catalyst of which atoms or oxide molecules are dispersed in a high dispersion over the carrier, having superior catalytic properties and superior catalytic efficiency, may be readily and effectively produced. Hence, conventional methods for producing catalysts may be replaced by the method according to the present invention.

Although the present invention has been described in conjunction with its preferred embodiment, it is readily understood that the invention is not limited by any of the details of the description and that various changes and modifications may be made by a person skilled in the art without departing from the spirit and scope of the present invention.

What is claimed is:

1. A method for producing a highly dispersed catalyst, comprising:
    mixing a cross linking agent with a polymer having a reactive functional group in its molecular chain in a solvent in order to cross-link the polymer with the cross linking agent;
    apply the mixture of cross-linked polymer and solvent to a carrier;
    drying the carrier in order to remove the solvent therefrom, to form a polymer film of the polymer over the surface of the carrier;
    impregnating the polymer film with a metallic complex compound solution in order in connect the complex compound to the reactive functional group of the polymer;
    reducing the metallic complex compound connected to the polymer to the corresponding catalyst metal in a reducing atmosphere; and then heating the carrier in order to remove the polymer film by decomposition.

2. A method as defined in claim 1, wherein the polymer is selected from the group consisting of polyethylene imine and polyacrylic acid.

3. A method as defined in claim 1, wherein the cross linking agent is selected from the group consisting of glutaraldehyde, glutaric acid, adipic acid, adipyl chloride, 1,6-dibromohexane, hexamethylenediamine and adipamide.

4. A method as defined in claim 1, wherein the carrier is selected from the group consisting of carbon, metallic carbides, metals, metal oxides, metal nitrides, semiconductors and polymer membranes.

5. A method as defined in claim 1, wherein the reduction of the complex compound is conducted in a hydrogen gas atmosphere.

* * * * *